United States Patent Office 3,150,960
Patented Sept. 29, 1964

3,150,960
RECOVERY OF PRECIOUS METALS
Von D. Hunter, Toronto, Ontario, Canada, assignor to Zareba Corporation, Limited, Toronto, Ontario, Canada, a company of Ontario
No Drawing. Filed June 9, 1961, Ser. No. 115,885
5 Claims. (Cl. 75—7)

This invention relates to a method for recovering precious metals, particularly to a method for recovering gold, silver and the platinum group of metals from certain types of geological deposits.

Many types of geological deposits are known which contain precious metals in various combinations. Some of these metals, such as gold and platinum, are frequently found in the metallic or native state either as small grains dispersed in sand or gravel or as small flecks dispersed in quartz or other minerals. Silver, on the other hand, is usually found in the form of compounds of the metal, such as the chloride or sulfide. Conventional metallurgical means have been worked out for recovering these metals from many different types of deposits, such means involving combinations of the steps of stamping, flotation, chlorination, leaching, amalgamation, roasting and the like. Generally speaking, the particular process employed depends primarily upon the form in which the metal is found and the character of the deposit in which it occurs.

There are certain kinds of minerals, however, which contain relatively small proportions of one or more of the precious metals which have heretofore resisted all attempts to separate and recover the metals economically. One such class of deposits is often referred to under the general heading of "shales" and is noted particularly for the tenacity with which the precious metals resist all heretofore known procedures for recovering them economically. As a matter of fact, there has long been some discussion and argument as to whether or not some of these deposits actually do contain more than bare traces of the precious metals because they do not respond readily to the classical fire assay methods for determining the presence and the amount of the precious metals in geological deposits. The members of one particular group of deposits which sometimes fall in this category are characterized by having a high content of silica, often as much as 60% to 80%, and by being relatively soft and friable. A considerable proportion of the silica often appears to be in the form of diatomaceous earth and there is some indication that the precious metals are largely associated with this part of the silica. Such shale deposits often contain an appreciable proportion of organic matter together with trace amounts of a large number of other elements. These organic material-containing shales are sometimes referred to as "bituminous" shales. They also frequently contain sizeable proportions of aluminum and iron compounds. Examples of shale deposits which contain small proportions of the precious metals are those often referred to as the Glacial or Black Sands of New York, the Decomposed Shales of Wyoming and certain sea formations of the New Jersey Sands.

It is a matter of interest that, although it is known that these and other similar deposits often do actually contain appreciable quantities of the precious metals, particularly of platinum and gold, their resistance to recovery of these metals by conventional procedures is so great that special theories have been proposed to account for this condition. Thus, it has been postulated that the precious metals occur in a "colloidal" state dispersed in or "entangled with" silica particles, presumably of sedimentary origin, and that they are often thus not accessible to the action of conventional agents. Furthermore, it also appears that when the precious metals are brought into solution, or dispersed form, by treating such minerals, more difficulty than would ordinarily be expected is encountered in recovering them from the solution, e.g. by precipitation. It has even been suggested that this is caused by dispersion of the colloidal metal from the ore into the aqueous treating agent still in the "colloidal" form rather than as a true solution of a compound of the metal. It has also been pointed out that roasting of shales containing such colloidal precious metals usually is likely to lead to a more permanent "fixing" of the precious metals in their inaccessible condition.

Regardless of the reasons why the precious metals are locked so securely in deposits of the kind just mentioned, it has been demonstrated by careful and exhaustive analytical procedures that precious metals are often present in certain of them in a proportion which, could they be recovered easily, would furnish a ready source for at least some of these metals. It is apparent that any method for the recovery of the precious metals, particularly of platinum and gold, from such deposits which would enable the major proportion of these values to be recovered economically would be of great value.

The present invention is, therefore, particularly concerned with the recovery of the precious metals from deposits of shale-type ores which are characterized by a relatively low concentration of the precious metals in the ore and by their presence therein in a form from which they are not recovered readily using more conventional procedures. Although the process of this invention is particularly well adapted to the recovery of precious metals from deposits of the types mentioned, it is, as will be seen, also adapted to the working up of "tailings" from conventional processes which still retain sufficient of the precious metals to render the new process of value when applied to them. Insofar as is known, the process can be applied to any silica or silicate type of ore although, as just pointed out, it is of especial value to the recovery of the precious metals from sedimentary shale deposits of the type just referred to. For the sake of convenience, such deposits are herein referred to as "shale-type ores."

It will be understood that, in describing the invention, although special emphasis is attached to the recovery of platinum and gold because in most instances these two metals occur in the greatest proportions in the types of geological deposits to which the process is particularly adapted, the process is well adapted to the recovery of other precious metals along with platinum and gold. This invention is not concerned with the separation of the recovered precious metals from one another subsequent to their recovery in metallic form, or as a product having a high concentration of compounds of the precious metals from which the metals can be recovered readily in metallic form, since such separations can be carried out by conventional procedures. The term "precious metals" as used herein includes gold, silver, platinum, iridium, rhodium, ruthenium, osmium and palladium—all of these except gold and silver being, of course, known as the "platinum group" metals.

The method will be described with particular reference to the recovery of precious metals, principally platinum and gold, from certain bituminous shales found in South Dakota, Wyoming and nearby States, representative samples of which have a loss on ignition of the dried material of from 4% to 8% by weight and comprise 60% to 70% of silica, 10% to 20% of alumina and 2% to 8% of iron oxide together with traces of many other substances. However, the method has been applied successfully to Giant Yellowknife ore, Alaskan Juneau dredge tailings, Dome South Porcupine ore, Campbell Red Lake ore, Tory Hill gravels, Saskatchewan shales and others. It appears that the loss on ignition of the South Dakota shale is accounted for to at least some extent by bituminous or other organic substances present in it.

Briefly, the process of this application comprises first digesting the finely ground ore with an aqueous acid solution, usually a heated solution, containing sulfate and chloride anions, often with the inclusion of an oxidizing agent and, sometimes, of other agents which will be referred to. The digestion mixture is then filtered and the filtrate treated with hydrogen sulfide under particular conditions which will be described to precipitate sulfides of the precious metals. The precipitated sulfides are recovered by filtering, dried and roasted either in air or in an atmosphere of oxygen, to remove sulfur and all traces of organic matter. The roasted product can then be reduced to the free metals by heating in an atmosphere of hydrogen and the reduced metals allowed to cool while still in a hydrogen atmosphere. Frequently it is advisable, prior to the reduction with hydrogen, to effect at least a partial purification of the roasted product by a method which will be described.

The residue from the filtration following the digestion step sometimes contains an appreciable proportion of the precious metals, especially of gold and often silver, originally present in the ore. When the proportion of gold or other precious metal in the residue is sufficiently great, it becomes economical to recover them from the residue from the digestion step, e.g. by cyaniding the residue. It is remarkable that, whereas cyaniding may not recover precious metals from the original ore in appreciable amounts, little or no difficulty is experienced in extracting them with aqueous cyanide from the digested ore. Following such cyaniding procedure, the mixture is filtered, the filtrate treated with hydrogen peroxide or other suitable agent to destroy all cyanide remaining in it and the cyanide-free solution acidified, filtered if necessary to clarify it, and added to the filtrate from the digestion step prior to the precipitation with hydrogen sulfide. Alternatively, the cyanide-free acid solution can be treated directly with hydrogen sulfide to precipitate precious metal sulfides therefrom. Generally speaking, however, when the digestion step is carried out as herein described, it is seldom that sufficient of the precious metals remain in the residue from the filtration to make it economical to attempt to recover them.

Although the invention will be described with particular reference to the employment of a digesting liquor for the ore which contains the chloride ion along with the sulfate ion, it should be mentioned that the chloride ion can often be replaced in whole or in part, and with equal satisfaction, with another halide ion, i.e. with one or more of the fluoride, bromide or iodide ions. The chloride ion is, however, the preferred halide ion from the point of economy. When one or more of the fluoride, bromide or iodide ions is employed, it is generally used to replace approximately a chemically equivalent proportion of the chloride ion.

In carrying out the digestion step, the ground ore and the acid digesting liquor are mixed and stirred, preferably at a temperature of from about 60° to about 100° C., for several hours. The digesting liquor is conveniently prepared by mixing sulfuric and hydrochloric acids with water, although other combinations of ingredients furnishing sulfate and chloride ions can be employed, as will be pointed out, and the several ingredients of the digestion mixture can be combined in any order. When sulfuric and hydrochloric acids are employed, the proportions thereof with respect to the amount of water and with respect to one another can be varied over a wide range, although it is preferable that the concentration of the sulfuric acid in the water used be at least from about 1.5 to about 2.0 molar. In instances where the ore employed contains carbonates or other substances which react with an acid, more acid must, of course, be used than is the case with ores where this condition does not exist. The proportion of hydrochloric acid to the sulfuric acid used can also be varied over wide limits although, generally speaking, the molar proportions of sulfuric and hydrochloric acids can conveniently be about equal to one another. Heating and stirring of the digestion mixture is generally carried out for several hours, the actual time depending upon the character and composition of the particular ore employed, the acidity of the aqueous digesting solution and to some extent upon the proportion of chloride ion to sulfate ion in the solution. Although any method of heating the mixture can be employed, it should be mentioned that on a laboratory scale, at least, the use of infrared radiation has been shown to be advantageous.

It is not possible to give optimum values for the composition of the digestion mixture or for the length of the digestion period which will apply in all cases since these factors depend to a great extent upon the properties of the actual ore employed. For this reason, in the treatment of any particular ore it is generally advisable to first carry out a series of experiments in which the proportions of sulfuric and hydrochloric acids in the liquid phase are varied over suitable ranges and in which the time and temperature of heating are also varied, and to then adjust these factors in the large scale treatment of the same ore to those which will give the maximum yield of precious metals as shown by the experiments. The proportion of actual digestion liquid in the mixture need be only great enough to provide a slurry which can be stirred and heated readily. The fineness to which the ore is ground is also of considerable importance since it appears that the finer the grinding the more completely and the more rapidly the precious metals, particularly platinum, are converted to a soluble form. In practice, it has been found practical and economical to grind the ore until at least 90 to 95% of it passes a 300-mesh sieve. However, more coarsely ground or more finely ground ore can be employed if desired.

In carrying out the digestion step as just described, it is frequently of advantage to introduce the chloride ion in the form of a water-soluble metal chloride which in the presence of sulfuric acid is at least partially broken down into hydrochloric acid and a sulfate of the metal involved. In such an instance it is, of course, advisable to increase the proportion of sulfuric acid to provide for the use of a part of it as a reactant with the metal chloride. Water-soluble metal chlorides which can be thus employed include ammonium chloride and the chlorides of the alkali and alkaline earth metals, e.g. sodium chloride, lithium chloride, potassium chloride, calcium chloride, barium chloride and strontium chloride. Insofar as is known, a heavy metal chloride can also be employed, if desired, although this is generally inadvisable because of the heavy precipitate of metal sulfide which results in a subsequent sulfide precipitation step of the process. Of these, the preferred chloride is lithium chloride, since it appears that in many instances the lithium cation is of considerable value in assisting the sulfate and chloride ions in converting the precious metals in the ore to a soluble form. The use of the other non-heavy metal chlorides mentioned in place of lithium chloride appears to cause more of the silica or other nondesirable substances in the ore to be dispersed in very finely divided form in the digesting liquid, thus leading to a digested mixture which is sometimes difficult to filter. Using lithium chloride as the soluble metal chloride this difficulty is not usually experienced. In the interest of economy, the lithium can, when its use is desirable, be introduced in the form of lithium carbonate, the amount of sulfuric acid being increased accordingly.

It is also desirable that the precious metals be carried into solution during the digestion in their highest state of oxidation, both to prevent further oxidation and reprecipitation of some of the values and to facilitate the carrying out of certain subsequent steps of the process, especially the precipitation of the metals as their sulfides.

Although in most instances the precious metals will be in their highest state of oxidation following the digestion procedure just given, it is convenient to insure this condition to incorporate a relatively small proportion of an oxidizing agent in the digestion mixture. Suitable agents include sodium hypochlorite, elemental chlorine, bleaching powder, sodium chlorate and the like. In fact, it appears that agitation of the mixture with air during heating is frequently adequate. In any event, the amount of oxidizing agent employed is usually not more than one half, on a molar basis, of the sulfuric acid employed and the oxidizing agent is preferably added periodically during the period of digestion.

Following the completion of the digestion step, the mixture is filtered, usually while still hot, and the residue washed with water, the filtrate and washings being combined for the subsequent precipitation step. The filtrate should be refiltered through a fine filter, if necessary, to insure its being perfectly clear for the next step. As mentioned previously, some difficulty may be experienced, in the case of some ores, in carrying out the filtration due to the presence of a considerable amount of finely divided insoluble matter in the mixture. It is thought that this material is largely silica which collects on the filter as a relatively impervious layer. In the event the filter is first coated with a filter aid to promote filtering, care should be exercised in selecting a filter aid which will absorb as little as possible of the precious metals from the solution. In particular, filter aids based on diatomaceous earth and other highly absorbent forms of silica should be avoided. Generally speaking, however, the mixture can be filtered without difficulty provided the digestion step has been carried out observing the foregoing precautions.

The precious metal sulfides are precipitated from the clear acid filtrate from the digestion step. Unless care is taken in carrying out this step the metal sulfides will form in what is apparently a colloidal or near-colloidal state in which they are practically impossible to recover from the solution by filtration. Also, due to the unavoidable presence of what appear to be silica-containing compounds in the perfectly clear solution, care must be exercised to avoid as much as possible any precipitation of these substances which would serve to hinder the subsequent filtration to recover the sulfides and would constitute a major contaminant of the recovered sulfides.

To avoid these and other difficulties as much as possible, it has been found that a preferred procedure involves saturating the clear solution from the digestion step at or slightly above ordinary room temperatures, e.g. at a temperature of from about 20° to 40° C. with hydrogen sulfide while causing the solution to be successively alkaline and then acid in character. To this end, an alkali, preferably ammonia, is added to the solution until it is at least neutral, preferably at pH 7.5 to pH 9, and the solution then treated with hydrogen sulfide until no more precipitate forms. Alternatively, the acid filtrate can be first saturated with hydrogen sulfide and ammonia then added. Iron and certain other base metals which are generally present in the solution are precipitated as their sulfides in the alkaline mixture and the mixture is black due to the presence of these substances. The alkaline mixture should be tested with starch iodide paper to be sure that it is free of oxidizing substances having an oxidizing action strong enough to liberate free iodine and cause discoloration of the starch iodide paper. Addition of hydrogen sulfide is continued until no test for oxidizing substances is obtained, the solution at this stage comprising both hydrogen sulfide and ammonium sulfide.

When the test for oxidizing substances with starch iodide paper shows negative, a mineral acid, e.g. sulfuric or hydrochloric acid, is added slowly to the mixture with continued stirring and addition of hydrogen sulfide, the reactor walls and stirrer above the liquid level being washed down to insure all precipitated sulfides of iron and other base metals being subjected to the action of the acid. The acid is added until the mixture is at a pH 3 or below, preferably at pH 1 or below, and the major proportion of the black sulfides have dissolved.

Stirring and the addition of hydrogen sulfide are continued until indications of coalescing of the precipitate are observed, usually after about 20 to 30 minutes. The stirring and the addition of hydrogen sulfide are then discontinued, the walls of the vessel and the stirrer are washed down with water and the mixture of solution and precipitate is boiled vigorously for a few minutes. The mixture is then allowed to stand until the precipitate has settled and is then filtered, the filtrate being discarded and the precipitate being washed thoroughly with water.

It should be mentioned that, in instances where undue reluctance of the precipitate of the precious metal sulfides to settle or flocculate in filterable form is encountered, it is often of considerable advantage to add a water-soluble mercuric salt, preferably mercuric chloride, to the acid solution after saturation with hydrogen sulfide. Mercuric sulfide is thus precipitated in the solution and this assists considerably in carrying down the precious metal sulfides in the form of a filterable precipitate. The amount of soluble mercuric salt required depends entirely upon the amount of precious metals contained in the solution as well as upon the difficulty encountered in causing flocculation of the precipitate into filterable form. In general, however, the amount of soluble mercuric salt added need not be more than about ten times, on a molar basis, the amount of precious metals in the solution. However, this value is given merely by way of illustration and is not to be construed as a limiting value since the optimum amount of mercuric salt to be added should be determined by testing successive portions of the filtrate with different amounts of mercuric salt in the case of each ore. In any event, the mercuric sulfide is subsequently removed entirely from the precious metal sulfides in the roasting procedure which will now be described.

Following the precipitation and recovery by filtration of the metal sulfides, the precipitate of sulfides is dried and roasted in the presence of oxygen until free of sulfur and any combustible matter which may be present. This is usually carried out in a suitable furnace, preferably using oxygen rather than air. When using oxygen the roasting operation is carried out at a temperature of at least about 500° C., preferably at a temperature of between about 500° and about 575° C. During this procedure any base metals present, as well as most of the precious metals themselves, are converted to the oxides, although in the case of gold, platinum and some of the other precious metals roasting in oxygen may serve partially to merely decompose the sulfides and drive off the sulfur, leaving the metal in elemental form. Some reoxidation of some of the metals may occur upon cooling of the roasted product. The product obtained may, therefore, be a mixture of such difficulty oxidizable metals together with the oxides of such metals as are oxidizable under the conditions given and also varying amounts of silica-like products which are generally unavoidably precipitated along with the metal sulfides. Although the roasting operation is preferably carried out using commercially pure oxygen, it is entirely possible to use air instead of oxygen, in which case the roasting is carried out at a temperature of at least 700° C., preferably at a temperature of between 700° and about 900° C. It should also be noted that during roasting at an elevated temperature any osmium or ruthenium will tend to be vaporized and carried out of the furnace in the gas stream. Such vaporized metal compounds are conveniently collected by conventional washing of the effluent gas stream in suitable manner. The washings can be worked up subsequently for recovery of such of the precious metal values as they may contain.

Following the roasting procedure, the roasted residue can be reduced with hydrogen in the way which will be described to obtain the metal values in elemental form or the residue can be first subjected to a refining step and the product from this step then reduced to obtain a mixture of the precious metals relatively free of silica-like substances. To effect the refining step according to one of two procedures which will be described, the roasted residue is placed in a suitable vessel and covered with an aqueous solution of a water-soluble halide, e.g. ammonium chloride or, preferably, lithium chloride, usually an 8% to 10% solution of the chloride in water. An amount of concentrated sulfuric acid equal to about 10% of the weight of water employed, is added carefully, together with sufficient of an oxidizing agent, e.g. sodium chlorate or nitric acid, to oxidize all of the precious metals in the residue to their highest state of oxidation, and the mixture stirred and heated almost to boiling for four to six hours, after which it is found that all metal oxides and metals in the mixture have been dissolved. The proportions of sulfuric acid and lithium chloride employed with respect to the weight of the residue are not critical so long as enough of the aqueous solution of the two is used to insure proper solution of all of the valuable constituents of the residue. If it appears that insufficient of the solution has been used to accomplish this end, more of the reagents are added and the heating continued. It is, however, preferred to use the sulfuric acid and the lithium chloride in approximately equimolecular proportions.

When it appears that no more of the residue will dissolve, the solution is cooled, filtered and the insoluble residue is discarded. The filtrate is diluted with water and the metal values precipitated with hydrogen sulfide according to the procedure described for precipitating the precious metal sulfides from the filtrate from the digestion step. In this instance coalescence of the sulfide precipitate usually proceeds readily and the steps of neutralizing the solution with ammonia and then reacidifying as described in connection with the first sulfide precipitation procedure can sometimes be omitted. The sulfides are eventually recovered by filtering and washing and the filtrate is discarded, the sulfides being roasted again in oxygen or air as described previously.

In another procedure, which is sometimes preferred, for effecting the refining step, the roasted residue is first treated with a mixture of concentrated hydrochloric, nitric and sulfuric acids to dissolve the metals and metal oxides in the roasted residue. The acid mixture employed preferably comprises roughly 1 part by volume of concentrated nitric acid, 2 parts of concentrated sulfuric acid and 3 parts of concentrated hydrochloric acid, although the proportions of the acids can be varied over wide ranges. Enough of the acid mixture is employed to dissolve all of the free metals and metal oxides in the roasted residue, the roasted residue and the acids being mixed together and allowed to stand for several hours with occasional stirring, usually at a temperature between about 30° and 40° C. The mixture is then diluted with water and filtered. The residue from this filtration should, if sufficient of the acid mixture has been employed, be perfectly white, finely divided silica. If it appears that all of the metals and metal oxides, as judged by the appearance of the residue of silica, have not been dissolved, the residue is dried and again treated with a further quantity of the acid mixture. The residue of silica is eventually discarded, or utilized for other purposes, and the filtrate is treated with hydrogen sulfide in the way described previously in connection with the refining step involving sulfuric acid, lithium chloride and an oxidizing agent. The precipitated sulfides are then roasted in air or oxygen as described previously.

The roasted residue, either with or without having been submitted to one of the refining steps just described, is then placed in a suitable furnace and heated in an atmosphere of hydrogen at a temeprature between about 800° and about 1200° C., preferably at about 1100° C. The reduction is continued until all of the metal oxides present have been reduced to the elemental metallic form, care being exercised to avoid a temperature high enough to fuse any silicates which may be present. The reduced mass is cooled to below about 100° C. while still in an atmosphere of hydrogen to prevent oxidation of some of the more easily oxidized metals. The final product thus obtained consists principally of a mixture of the precious metals and their alloys containing a relatively small proportion of base metal impurities, such as iron, nickel, chromium and other metals, the nature of which depends primarily upon the composition of the ore originally treated.

Certain advantages of the invention are apparent from the following examples which are given by way of illustration only and are not to be construed as limiting.

The ore referred to in the examples was a decomposed bituminous shale from South Dakota. The ore contained approximately 64.2% silica, approximately 14% alumina, approximately 5% iron oxides and approximately 1.7% magnesia, together with trace and very minor amounts of a large number of other substances. The ore was practically free of chlorides and sulfide sulfur. A sample of the ore lost 3.1% by weight when heated at 105° C. and the dried sample suffered a further loss of 6.5% upon ignition. The ore was dark grey in color and was in typical layered shale formation. It was friable and easily ground. Unless otherwise noted, the ore was ground dry to pass a 300-mesh screen before use. Assay of the ore by conventional fire assay procedures gave little or no indication of the presence of precious metals.

*Example 1*

Six hundred grams of the foregoing ore (20 assay tons dry ore basis) in the form of lumps having a diameter of about 2 inches or less was placed, together with 3 liters of water and 5 grams of lithium carbonate, in a pebble mill and the mill rotated for 3 hours. The product, which was in the form of a thin slurry, was placed in a suitable vessel and stirred while 11 milliliters of 37.4% aqeuous hyrochloric acid solution was added slowly. Stirring was continued until frothing ceased and 3.7 ml. of concentrated sulfuric acid was then added slowly. The acidified mixture was heated at 95° C. and stirred for 6 hours. The mixture was strongly acid. The hot solution was then filtered and the residue washed with water and discarded. The filtrate was only slightly colored.

The combined filtrate and washings were heated to approximately 30° C. and a steam of hydrogen sulfide gas was bubbled into the solution for about 4 minutes until the solution was nearly saturated with the gas. The mixture was light yellowish-brown in color but free of any visible precipitate. Stirring and the addition of hydrogen sulfide were continued and strong aqua ammonia was added carefully until the solution was at approximately pH 7.5. The entire mixture was black, due to the formation of a black precipitate. The solution gave no test for an oxidizing agent with starch iodide paper.

The addition of hydrogen sulfide and stirring of the mixture were continued while concentrated aqueous hydrochloric acid was added slowly until the solution was at between pH 1 and pH 2, most of the precipitate dissolving and that remaining being dark brown in color. The addition of hydrogen sulfide was continued for an additional 20 minutes to insure complete saturation of the liquid and then discontinued and the mixture heated to about 50° C. The hot mixture was allowed to stand for about four hours for the precipitate to settle and then filtered through filter paper. The filtrate was discarded.

The filter paper containing the precipitated sulfides was rolled up carefully and dried at 110° to 115° C. The dried paper and contents were then heated in an atmosphere of oxygen at a temperature between 500° and 550° C. until free of sulfur and organic matter.

The roasted material from the preceding step was then heated for about 30 minutes at 925° C. in an atmosphere of hydrogen and allowed to cool without removing from the hydrogen atmosphere.

The foregoing procedure was repeated several times with varying quantities of reagents and the products obtained from 2100 grams (70 assay tons) of the ore were combined and mixed thoroughly. The mixture weighed 202.3 milligrams, equal to an average of 2.9 mg. per assay ton. Analysis of the mixture showed it to have the following composition by weight:

|  | Percent |
|---|---|
| Platinum | 33.40 |
| Gold | 3.46 |
| Silver | 3.80 |
| Palladium | 4.50 |
| Ruthenium | 0.12 |
| Iridium | 0.12 |
| Rhodium | 0.24 |
| Osmium | 0.04 |
| Inert (balance by difference) | 54.32 |

The inert material was shown, qualitatively, to comprise silica iron, nickel, copper and zinc.

*Example 2*

The procedure of Example 1 was repeated except that the ore and water were mixed and the lithium carbonate was added to the slurry of ground ore and water. The mixture was then acidified with 33.7 ml. of concentrated sulfuric acid and 90 ml. of concentrated aqueous hydrochloric acid. In this instance the recovery of product following the steps of heating and cooling in an atmosphere of hydrogen was 70.7 mg. or 3.53 mg. per assay ton of ore.

In a repetition of the procedure of the preceding paragraph, 40 grams of lithium carbonate was added to the wet slurry of ground ore and water and the mixture was then acidified with 60 ml. of concentrated sulfuric acid and 88 ml. of concentrated hydrochloric acid. In this instance the product obtained following the steps of heating and cooling in an atmosphere of hydrogen weighed 64.7 mg. or 3.24 mg. per assay ton of ore.

*Example 3*

The procedure of Example 1 was repeated except that the ore was ground dry to pass a 300-mesh screen prior to being mixed with the water and lithium carbonate. In this instance the recovery of material following the reduction with hydrogen was 47.5 mg. or 2.35 mg. per assay ton of ore.

In another instance the procedure of the foregoing paragraph was repeated except that 20 grams of lithium carbonate, 30 ml. of concentrated sulfuric acid and 44 ml. of concentrated hydrochloric acid were employed. In this instance the product recovered following the reduction with hydrogen amounted to 41.2 mg. or 2.06 mg. per assay ton of ore.

*Example 4*

In a modification of the procedure of Example 3, 600 grams of the dry ground ore, 3 liters of water, 40 grams of lithium chloride and 52 milliliters of concentrated sulfuric acid, but no hydrochloric acid, were used in making up the digestion mixture. In this instance the recovery of product following the hydrogenation step was 45.8 mg. or 2.29 mg. per assay ton of ore.

The procedure of the preceding paragraph was repeated using 20 grams of lithium chloride and 26 ml. of concentrated sulfuric acid. In this instance the recovery of product following the reduction with hydrogen was 65.4 mg. or 3.27 mg. per assay ton of ore.

*Example 5*

The procedure of Example 1 was repeated except that the acid filtrate from the digestion step was saturated with hydrogen sulfide, heated to about 50° C. and allowed to stand for several hours, the neutralization and reacidification steps being omitted. The solution retained its brownish color but remained essentially free of any visible precipitate. Filtration of the mixture led to the recovery of only a trace of colored precipitate on the filter.

Neutralization of the filtrate with ammonia and subsequent acidification with hydrochloric acid, while passing in hydrogen sulfide gas, followed by heating to about 50° C. and settling the precipitate, substantially as included in the procedure of Example 1, led to the recovery, upon filtering the mixture, of a dark precipitate which, without weighing, appeared to be about equal in amount to the precipitate obtained in Example 1.

In still another variation of the procedure of Example 1, the acid filtrate from the digestion step was first neutralized with ammonia before addition of hydrogen sulfide was begun, the subsequent acidification and recovery steps being carried out as described. In this instance the amount of reduced product recovered was substantially as great as that recovered in Example 1.

*Example 6*

A quantity of roasted product obtained substantially as by the procedure of the foregoing example carried through the roasting step was placed in a suitable vessel and covered with a 10% aqueous solution of lithium chloride followed by an amount of concentrated sulfuric acid equal to approximately 10% of the water in the lithium chloride solution. The mixture was then heated at near its boiling temperature for about 5 hours. This procedure dissolved all of the metal oxides and metals from the roasted product. The mixture was then cooled and filtered, the residue being discarded. The filtrate was diluted with water and saturated with hydrogen sulfide. The brownish black precipitate which formed settled readily when the mixture was heated to about 95° C. The hot settled mixture was filtered through filter paper and the filtrate was discarded. No undue difficulty was experienced during this filtration.

After washing the precipitate with hot water on the filter, the filter paper carrying the metal sulfides was rolled up and dried and then ignited at about 550° C. in a current of oxygen. Following the ignition with oxygen, the product was reduced with hydrogen at about 1100° C. and cooled while still in a hydrogen atmosphere. The final product thus obtained was a mixture of metals and alloys having approximately the same proportions of precious metals with respect to one another as the starting mixture, but having a much smaller content of inert material.

*Example 7*

In a variation of the refining step, a quantity of the roasted product was covered with a mixture consisting of approximately 1 part by volume of concentrated nitric acid, 2 parts of concentrated sulfuric acid and 3 parts of concentrated aqueous hydrochloric acid. The mixture was warmed at 30° to 40° C. for four hours, heated to expel nitrogen oxide fumes and then cooled, diluted with water and filtered. The residue, which was discarded, appeared to be a high quality grade of finely divided silica. The filtrate was made slightly alkaline with ammonia and hydrogen sulfide gas passed into it until no further precipitate formed and the mixture gave no positive test with starch iodide paper. Hydrochloric acid was then added to the mixture until it was at about pH 1 and the addition of hydrogen sulfide stopped. A few milliliters of mercuric chloride solution was then stirred into the mixture, after which the mixture was boiled vigorously for a few minutes and allowed to stand until the precipitate of metal sulfides settled. The precipitate was recovered by filtering and washing.

The recovered precipitate was dried, roasted in oxygen at about 550° C. and the roasted product reduced with hydrogen at about 1100° C. and cooled in an atmosphere of hydrogen. The final product was in the form of metal-

Example 8

Six hundred grams of the ground ore was digested essentially as by the procedure of Example 1 with a solution comprising 2200 ml. of water, 275 ml. of concentrated sulfuric acid and 415 ml. of concentrated hydrochloric acid. The digestion mixture was worked up following roughly the procedure of Example 1, the amount of crude reduced product obtained amounting to 3.40 mg. per assay ton of ore.

Example 9

The procedure of Example 8 was repeated except that 12 ml. of concentrated nitric acid was included in the digestion mixture and only 1335 ml. of water was used. The recovered crude reduced product amounted to 3.598 mg. per assay ton or ore.

Example 10

Twenty assay tons (600 grams) of the ground ore was digested with a solution comprising 1900 ml. of water, 39 ml. of concentrated sulfuric acid and 60 grams of lithium chloride. Upon carrying out essentially the procedure of Example 1, the final reduced product amounted to 3.67 mg. per assay ton of ore.

Example 11

A quantity of the ground ore was treated substantially as by the procedure of Example 1 except that the digesting solution consisted of a dilute solution of sulfuric acid. Essentially no metallic product was obtained following the hydrogen reduction step. The same result was obtained when the concentration of sulfuric acid in the digestion solution was increased to as much as 10%. The same was true when lithium sulfate was added to the digesting solution.

A quantity of the ground ore was treated with dilute hydrochloric acid following essentially the procedure of the preceding paragraph. No evidence of extraction of precious metals from the ore was obtained.

I claim:

1. In a method for recovering at least one metal selected from the group consisting of gold, silver, platinum, iridium, rhodium, ruthenium, osmium and palladium from a bituminous shale containing said metal together with silica, said metal being entangled with said silica, the steps of (1) digesting the shale with an aqueous acid solution containing sulfate and chloride anions, (2) separating a clear solution containing said metal from the leached shale residue, (3) contacting said clear solution with sulfide anions while making the solution first alkaline and then acid to precipitate said metal as its sulfide, (4) separating the precipitated metal sulfide from said solution, (5) roasting the separated sulfide in an oxidizing atmosphere at a temperature above 500° C., and (6) treating the oxidized product in a hydrogen atmosphere at a temperature between 800° C. and 1200° C. to reduce it to the free metal.

2. A method as claimed in claim 1 in which the aqueous acid solution which digests the shale also includes a cation selected from the group consisting of alkali metal, alkaline earth metal and ammonium cations.

3. A method as claimed in claim 1 in which said solution from which said metal is precipitated as a sulfide is made alkaline by adding ammonia.

4. A method as claimed in claim 1 in which said sulfide anion for precipitation of said metal as its sulfide is furnished by continuously passing hydrogen sulfide through said solution.

5. A method as claimed in claim 1 in which the free metal after its production by reduction of the oxidized product is cooled to at least about 100° C. in an oxygen-free atmosphere.

References Cited in the file of this patent

UNITED STATES PATENTS

| | | |
|---|---|---|
| 1,876,943 | Hull | Sept. 13, 1932 |
| 1,896,807 | Bauer | Feb. 7, 1933 |
| 2,694,006 | Schaufelberger | Nov. 9, 1954 |
| 2,786,752 | Appell | Mar. 26, 1957 |
| 2,863,760 | Ashley et al. | Dec. 9, 1958 |
| 2,875,040 | Barabas | Feb. 24, 1959 |
| 2,972,531 | Zimmerley et al. | Feb. 21, 1961 |